(12) United States Patent
Chuang et al.

(10) Patent No.: US 8,139,898 B2
(45) Date of Patent: Mar. 20, 2012

(54) IMAGE PROCESS METHOD AND APPARATUS FOR IMAGE ENLARGEMENT AND ENHANCEMENT

(75) Inventors: Jen-Hui Chuang, Hsin-Chu (TW); Szu-Hui Wu, Hsin-Chu (TW); Horng-Horng Lin, Hsin-Chu (TW); Shih-Shiung Huang, Hsin-Chu (TW); Yao-Jen Hsieh, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 994 days.

(21) Appl. No.: 12/112,244

(22) Filed: Apr. 30, 2008

(65) Prior Publication Data

US 2008/0310761 A1    Dec. 18, 2008

(30) Foreign Application Priority Data

Jun. 12, 2007    (TW) .............................. 96121237 A

(51) Int. Cl.
 *G06K 9/32* (2006.01)
 *G06K 5/00* (2006.01)
 *G09G 5/00* (2006.01)
(52) U.S. Cl. .......................... 382/299; 358/1.2; 345/660
(58) Field of Classification Search .................. 382/173, 382/224, 254, 274–275, 298–300, 305, 312; 358/1.2, 525, 528; 345/606, 660
See application file for complete search history.

(56) References Cited

U.S. PATENT DOCUMENTS

| | | | |
|---|---|---|---|
| 5,148,501 A | 9/1992 | Enomoto et al. | |
| 5,335,293 A * | 8/1994 | Vannelli et al. | 382/110 |
| 5,917,935 A * | 6/1999 | Hawthorne et al. | 382/149 |
| 6,038,039 A | 3/2000 | Zeng | |
| 6,317,523 B1 * | 11/2001 | Miura et al. | 382/298 |
| 6,400,413 B1 | 6/2002 | Miyake | |
| 6,628,330 B1 | 9/2003 | Lin | |
| 6,642,962 B1 | 11/2003 | Lin et al. | |
| 6,774,943 B1 | 8/2004 | Kao et al. | |
| 7,082,211 B2 * | 7/2006 | Simon et al. | 382/118 |
| 7,133,053 B2 | 11/2006 | Chen | |
| 7,295,702 B2 * | 11/2007 | Vrhel | 382/165 |
| 7,327,904 B2 | 2/2008 | Zhou et al. | |
| 7,471,292 B2 * | 12/2008 | Li | 345/427 |
| 7,778,493 B2 * | 8/2010 | Ho et al. | 382/299 |

\* cited by examiner

*Primary Examiner* — Kanjibhai Patel
(74) *Attorney, Agent, or Firm* — Thomas, Kayden, Horstemeyer & Risley, LLP

(57) ABSTRACT

An image processing device includes an image acquisition module, a memory module, and an image signal processing module, for performing an image enlargement and enhancement. The image acquisition module sequentially reads in an image block, including a unit pixel matrix and an exterior pixel matrix, wherein each pixel matrix includes a plurality of pixels and each pixel is associated with a parameter. The memory module stores a plurality of predefined edge patterns. The image signal processing module compares a loaded image block with predefined edge patterns, and determines if it is an edge block. Then, the image signal processing module further classifies its pixels into two groups, and calculates a continuous separating boundary between the two groups. Finally, the image signal processing module enlarges an edge block by placing new pixels inside its unit pixel matrix, wherein the new pixel parameters are extrapolated from the two classified pixel groups to maintain a sharp edge boundary. For those that are not edge blocks, interpolations are performed by the image signal processing module to derive smooth enlargements.

31 Claims, 15 Drawing Sheets

(a)

(b)

(c)

IMAGE PROCESS METHOD AND APPARATUS FOR IMAGE ENLARGEMENT AND ENHANCEMENT

This application claims priority based on Taiwan Patent application No. 096121237 filed on Jun. 12, 2007.

BACKGROUND OF THE INVENTION

1. Field of the Invention

The present invention relates to an image process method, and more particularly, to an apparatus and image process method for enlarging and enhancing images.

2. Description of the Prior Art

It is common in the field of digital image processing to increase the resolution of a digital image in order to enlarge the image for display or hardcopy output. For example, when an HDTV receives television signals in NTSC format, since the image resolution provided by HDTV can go up to 1920 by 1080 while the image resolution in NTSC format can only be 648 by 486, it is necessary to perform image enlargement for displaying the images on the television.

Furthermore, sources images such as JPEG photographs, Internet, and WEBTV files are often compressed to reduce the storage capacity requirements. Therefore, when, for instance, a user would like to create a print of the file with higher resolution or merely to get a closer look at a particular detail within the original image, there will be a need to perform image enlargement.

Resolution enhancement is crucial to image enlargement, and it can often be done by interpolating the low resolution data to a higher resolution. In the image processing software of today, some of the computerized methods used for improving the data resolution include Sinc interpolation, bilinear interpolation, bicubic interpolation, and nearest neighbor interpolation. For each type of interpolation, a kernel function is used to compute the values of the new pixels based on the values of the original pixels sampled from the original image. Since the kernel functions used by interpolation methods are different from one another, each interpolation method will produce different results when enlarging the source image.

The methods mentioned above usually perform satisfactorily for interpolating images having smooth textures. However, as for some methods such as bilinear interpolation, the algorithms used tend to average image data across high-contrast boundaries like edges and rapid contrast change zones, which may cause a blocky or blurry result appears on the enlarged image. Hence, these methods are not effective in terms of edge and detail rendition.

SUMMARY OF THE INVENTION

One object of the present invention is to provide an image process method of image enlargement and enhancement used by an image processing device, wherein the method comprises the following steps: acquiring an unit pixel matrix from an image block, wherein the unit pixel matrix includes a plurality of pixels and each pixel is associated with an image parameter; classifying each pixel into a first pixel group or a second pixel group by comparing the image parameters of the pixels of the unit pixel matrix; generating a continuous virtual boundary between the first pixel group and the second pixel group; and inserting pixels inside a first region and a second region and determining the image parameters of the inserted pixels for enlarging the image block, wherein the first region is encompassed by the continuous virtual boundary and the pixels of the first pixel group, and the second region is encompassed by the continuous virtual boundary and the pixels of the second pixel group.

Another object of the present invention is to provide a method of image enlargement and enhancement used by an image processing device, wherein the method comprises the following steps: acquiring an unit pixel matrix and an exterior pixel matrix from an image block, wherein the unit pixel matrix and the exterior pixel matrix each including a plurality of pixels, and each pixel is associated with an image parameter; generating a plurality of predefined edge patterns, wherein each predefined edge pattern passes between the pixels of the unit pixel matrix; classifying each pixel into one of the group selected from a first pixel group and a second pixel group by comparing the image parameters of the pixels; setting one of the predefined edge patterns as a continuous virtual boundary between the first pixel group and the second pixel group according to the comparison results; and inserting pixels insides a first region and a second region and determining image parameters of the inserted pixels for enlarging the image block, wherein the first region is encompassed by the continuous virtual boundary and the pixels of the first pixel group from the unit pixel matrix, and the second region is encompassed by the continuous virtual boundary and the pixels of the second pixel group from the unit pixel matrix.

It is another object of the present invention to provide an image processing device comprising an image acquisition module, a memory module, and an image signal processing module. The image acquisition module acquires a unit pixel matrix and an exterior pixel matrix, wherein the unit pixel matrix and the exterior pixel matrix each including a plurality of pixels, and each pixel is associated with an image parameter. The memory module stores a plurality of predefined edge patterns, wherein each predefined edge patterns passes between the pixels of the unit pixel matrix. The image signal processing module first classifies each pixel into a first pixel group or a second pixel group by comparing the image parameters of the pixels. Then, the image signal processing module sets one of the predefined edge patterns from to the memory module as a continuous virtual boundary between the first pixel group and the second pixel group according to the comparison results. Finally, the image signal processing module will then insert pixels insides a first region and a second region and determines the image parameters of the inserted pixels for enlarging the image block, wherein the first region is encompassed by the continuous virtual boundary and the pixels of the first pixel group from the unit pixel matrix, and the second region is encompassed by the continuous virtual boundary and the pixels of the second pixel group from the unit pixel matrix.

By using the method of image enlargement and enhancement of the present invention to enlarge image blocks, through the image edge detection combines with the appropriate way of enlargement (enlargement by interpolation or enlargement by extrapolation), the enlarged image is able to maintain its smooth textures across high-contrast boundaries like edges and rapid contrast change zones. Furthermore, the problem of a blocky or blurry result appears on the enlarged image may also be further improved.

DETAILED DESCRIPTION OF THE PREFERRED EMBODIMENT

The present invention provides an image process method for enlarging and enhancing images and an image processing device using the image process method. The image processing device mentioned here is referring to any device that can receive and process image signals. In the preferred embodiment, the image processing device may be a computer, a television, a printer, or any other type of image processing device, wherein the image processing device can receive an image block and uses the image process method of image enlargement and enhancement of the present invention to process the image block. However, the image process method of image enlargement and enhancement of the present invention can be utilized in other different embodiments and is not limited to be used in the embodiment mentioned above.

The first embodiment of the present invention is a image process method of image enlargement and enhancement used in an image processing device. In this embodiment, the image process method of image enlargement and enhancement can be a program executed by the image processing device and is stored in the hardware memory of the image processing device, such as a random access memory (RAM), a read-only memory (ROM), an application specific integrated circuit (ASIC), or their equivalents. Furthermore, this program can be written in C programming language, MATLAB programming language, or any other programming language that can be used to implement the algorithms of the program. In order to aid understanding, the invention is described with respect to the embodiment in terms of a computer application. This is no way intended as a limitation on the practical use of the present invention nor should any be implied therefrom.

In the first embodiment of the present invention, the image processing device can implement the image process method of image enlargement and enhancement through an image signal processing module. The image processing device can include RAM and/or ROM, wherein the program for implementing the image process method of image enlargement and enhancement is stored inside the ROM, and the image processing device can process images according to this program. Before processing the images, the ROM will first transfer the data needed for executing the program to the RAM, wherein the data will be stored inside the RAM temporarily. During the process of executing the program, the image signal processing module will extract the data out from RAM and at the same time utilize the RAM to perform the necessary arithmetic needed for executing the program.

Figure 1:
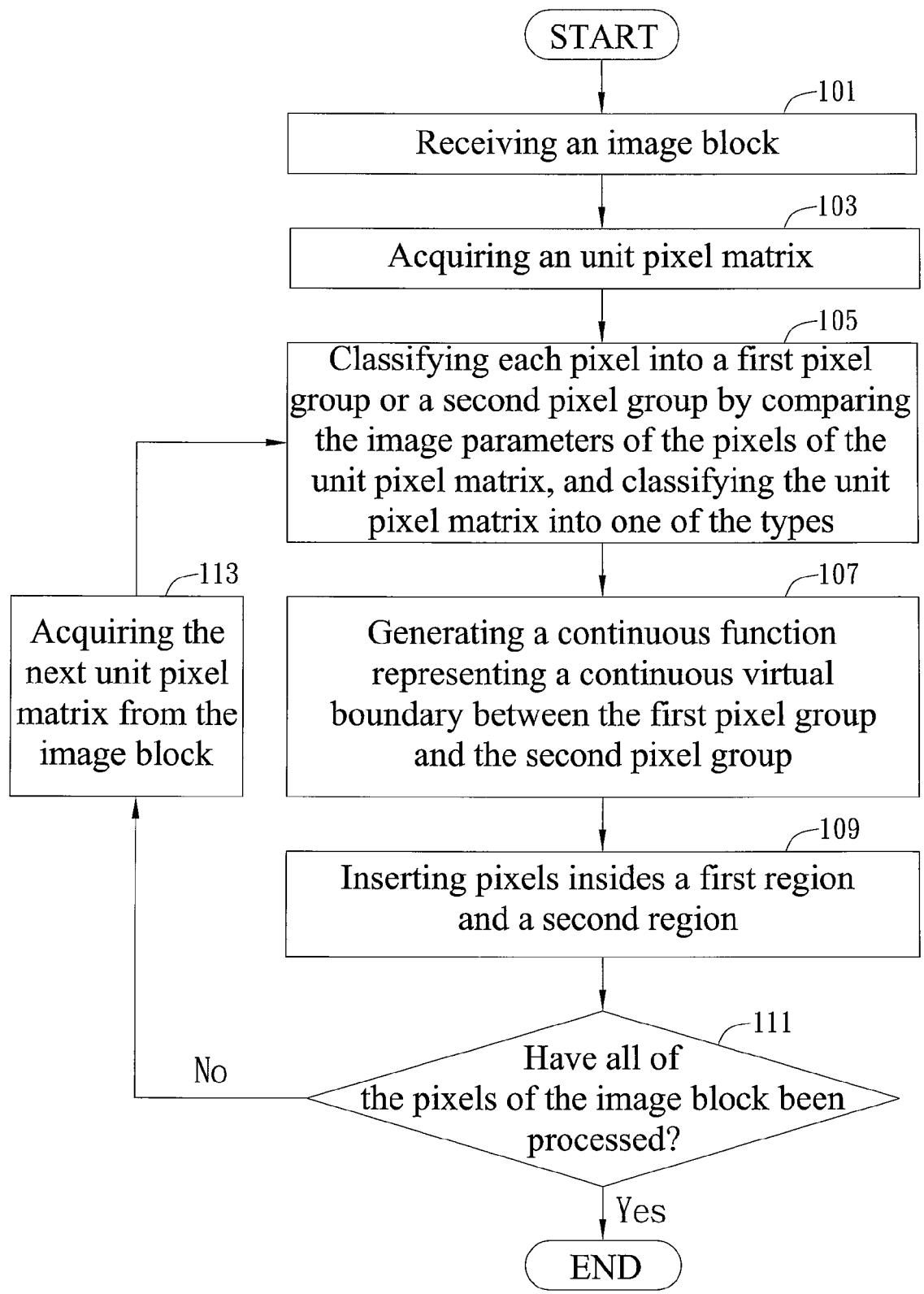
FIG. 1 is a flowchart of the first embodiment of the present invention.

As shown in FIG. 1, the image process method of image enlargement and enhancement starts out with step 101. In step 101, the image signal processing module receives an image block, wherein the image block can be a television signal sent from the television station, an image file downloaded from the internet, a picture file taken by the digital camera, or its equivalents.

Figure 2:
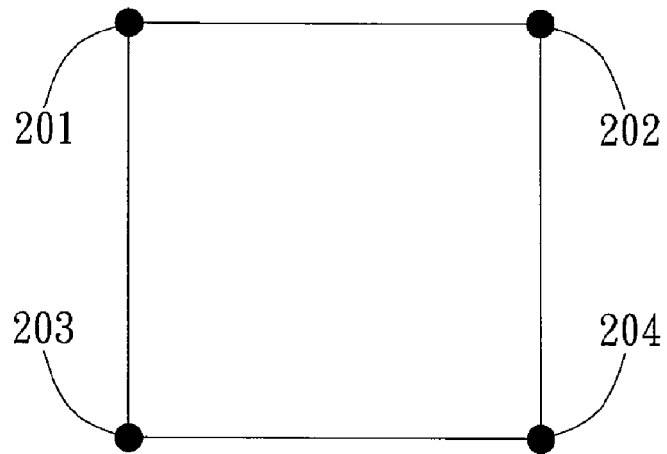
FIG. 2 is a schematic view of an unit pixel matrix.

When the image block is received by the image signal processing module in step 101, the image process method of image enlargement and enhancement will proceed to step 103. In step 103, the image signal processing module acquires a unit pixel matrix 200 from the image signal block. As shown in FIG. 2, the unit pixel matrix 200 includes a pixel 201, a pixel 202, a pixel 203, and a pixel 204 in a square array, wherein each pixel is associated with an image parameter. The image parameter can be the luminance, the hue value, the color, or the saturation of the corresponding pixel. In different embodiments, the unit pixel matrix 200 can include a total of eight pixels arranged in a 4×2 rectangular array. The unit pixel matrix 200 can also have different number of pixels arranged in a 3×3 rectangular array, a 4×4 rectangular array, or arrays of other size.

Figure 3:
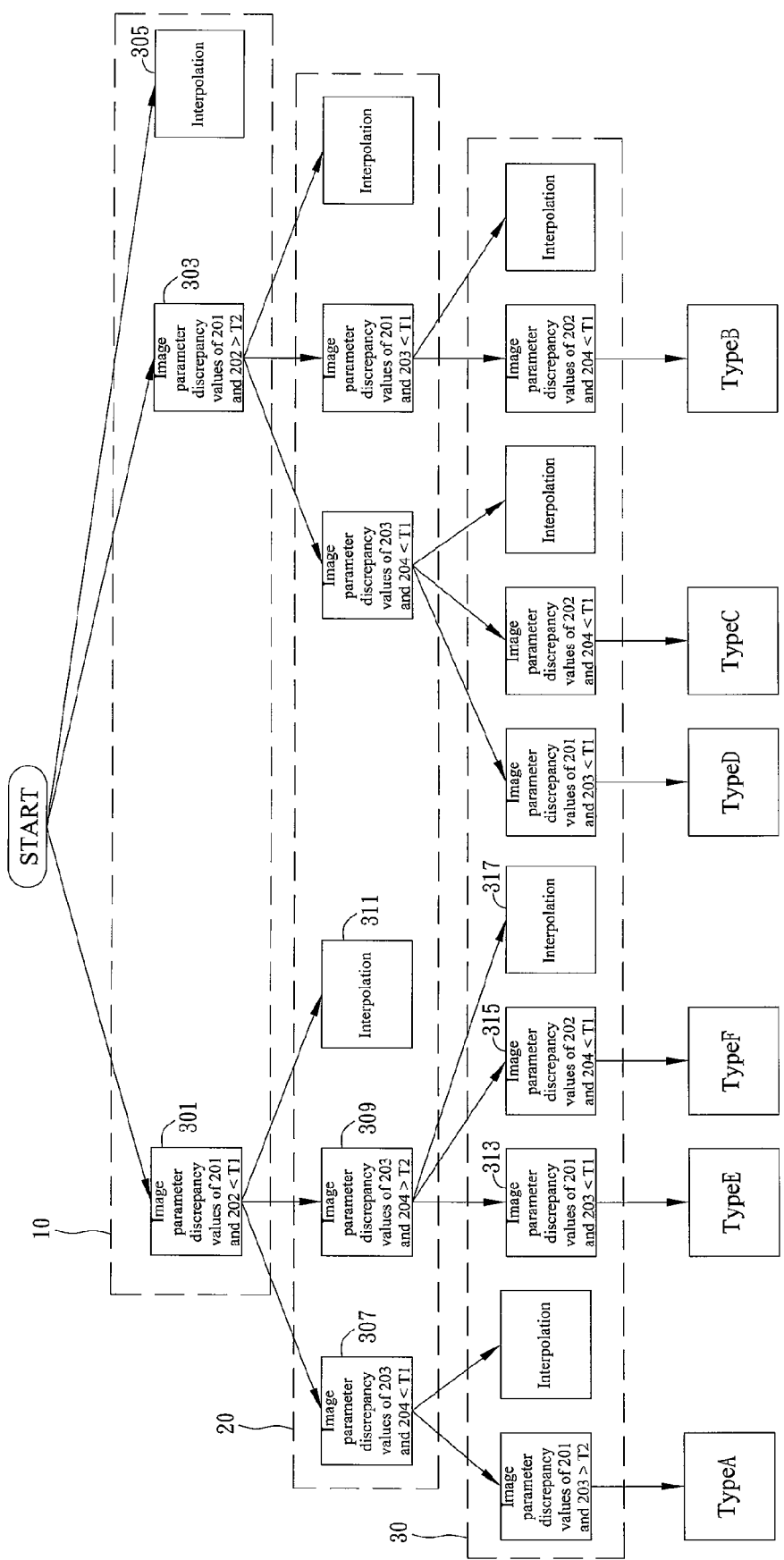
FIG. 3 is a tree structure showing how the pixels are compared and classified in the first embodiment of the present invention.

When the unit pixel matrix 200 is acquired from the image signal block in step 103, the image process method of image enlargement and enhancement will proceed to step 105. In step 105, the image signal processing module compares the image parameter of each pixel of the unit pixel matrix 200, and classifies each pixel into a first pixel group 420 or a second pixel group 440 according to the comparison result. After each pixel is classified into one of the pixel group, the image signal processing module then classifies the unit pixel matrix 200 as one of different types (explained later). The tree structure in FIG. 3 represents how the image signal processing module compares and classifies the pixels. As seen from the tree structure in FIG. 3, the unit pixel matrix 200 of the image block is able to be classified into six possible types, which are type A, type B, type C, type D, type E, and type F. In order to aid understanding the process of how the image signal processing module classifies the unit pixel matrix 200 into a type E is discussed below, and the same principle can be applied to the process of classifying the unit pixel matrix 200 into one of the other five types. As shown in FIG. 3, the tree structure includes a first-level test 10, a second-level test 20, and a third-level test 30, and each test includes at least one comparison step. Within each test, at least one image parameter discrepancy value is computed and is used in its corresponding comparison step. Furthermore, each image parameter discrepancy value is associated with the discrepancy in the image parameters of two pixels in the unit pixel matrix 200. The image signal processing module first executes a first-level test 10. In the first-level test 10, an image parameter discrepancy value 12, which is the discrepancy in the image parameters of the pixel 201 and the pixel 202, is computed. If, in the comparison step 301, the image signal processing module determines that the image parameter discrepancy value 12 is less than a first threshold value T1, the image signal processing module classifies the pixel 201 and the pixel 202 into the same pixel group temporarily. If, in the comparison step 303, the image signal processing module determines that the image parameter discrepancy value 12 is greater than a second threshold value T2, the image signal processing module classifies the pixel 201 and the pixel 202 into different pixel groups temporarily. If the image signal processing module determines that the image parameter discrepancy value 12 is between the first threshold value T1 and the second threshold value T2, the step 305 is executed. In the step 305, the image signal processing module performs interpolation to enlarge the section of the image block (received from the step 101) encompassed by the unit pixel matrix 200, wherein the pixel 201, the pixel 202, the pixel 203, and the pixel 204 of the unit pixel matrix 200 are used as the reference points in the interpolation to obtain the image parameters of the new pixels inserted inside the unit pixel matrix 200 for enlarging the section of the image block. The interpolation performed can be a bicubic interpolation, a bilinear interpolation, a nearest neighbor interpolation, or any other type of interpolation. Now suppose that in the comparison step 301 the image signal processing module determines that the image parameter discrepancy value 12 is less than the first threshold value T1. The image signal processing module will then proceed to a second-level test 20 of the tree structure in FIG. 3.

In the second-level test 20, an image parameter discrepancy value 34, which is the discrepancy in the image parameters of the pixel 203 and the pixel 204, is computed. If, in the comparison step 307, the image signal processing module determines that the image parameter discrepancy value 34 is less than the first threshold value T1, the image signal processing module classifies the pixel 203 and the pixel 204 into the same pixel group temporarily. If, in the comparison step 309, the image signal processing module determines that the image parameter discrepancy value 34 is greater than the second threshold value T2, the image signal processing module classifies the pixel 203 and the pixel 204 into different pixel groups temporarily. If the image signal processing module determines that the image parameter discrepancy value 34 is between the first threshold value T1 and the second threshold value T2, the step 311 is executed, wherein in the step 311 the image signal processing module performs the same task as in the step 305. Now suppose that in the comparison step 309 the image signal processing module determines that the image parameter discrepancy value 34 is greater than the second threshold value T2, then the image signal processing module will proceed to a third-level test 30 of the tree structure in FIG. 3.

In the third-level test 30, an image parameter discrepancy value 13, which is the discrepancy in the image parameters of the pixel 201 and the pixel 203, is computed. If, in the comparison step 313, the image signal processing module determines that the image parameter discrepancy value 13 is less than the first threshold value T1, the image signal processing module classifies the unit pixel matrix 200 into type E. In this case where the unit pixel matrix 200 is classified to type E, the pixel 201, the pixel 202, and the pixel 203 of the unit pixel matrix 200 are classified into the first pixel group 420, whereas the pixel 204 is classified into the second pixel group 440. In short, by following the tree structure of FIG. 3 to classify the unit pixel matrix 200 into one of the types, the pixels of the unit pixel matrix 200 are also classified into the first pixel group and the second pixel group, wherein the pixels that are classified to the same pixel group have their image parameter discrepancy values with one another to be less than the first threshold value T1. Following this rule, the member(s) of the first pixel group and the second pixel group for each one of the six possible types (type A, B, C, D, E, and F) is/are different. However, if in the comparison step 313 the image signal processing module determines that the image parameter discrepancy value 13 is not less than the first threshold value T1, the image signal processing module proceeds to the comparison step 315 or the step 317.

In the present embodiment, if the image parameter associated with each pixel is the luminance intensity value of the pixel, the first threshold value T1 being compared to in each of the comparison steps can be a value between 30 to 50 units of luminance intensity, whereas the second threshold value T2 can be a value between 100 to 150 units of luminance intensity. However, the two threshold values can be set to different values depending on the user's preference. Furthermore, when the image parameter discrepancy value of two pixels is less than the first threshold value T1, it is to be concluded that the section of the image block encompassed by the two pixels is not an edge block. Similarly, when the image parameter discrepancy value of two pixels is between the first threshold value T1 and the second threshold value T2, it is to be concluded that the section of the image block encompassed by the four pixels of the unit pixel matrix 200 is also not an edge block. However, when the image parameter discrepancy value of two pixels is greater than the second threshold value T2, it is to be concluded that the section of the image block encompassed by the two pixels is an edge block. However, the rule of determining whether or not an edge block exists between the pixels depends on the user's preference and is not limited to the way described above in the present invention.

Figure 4A:
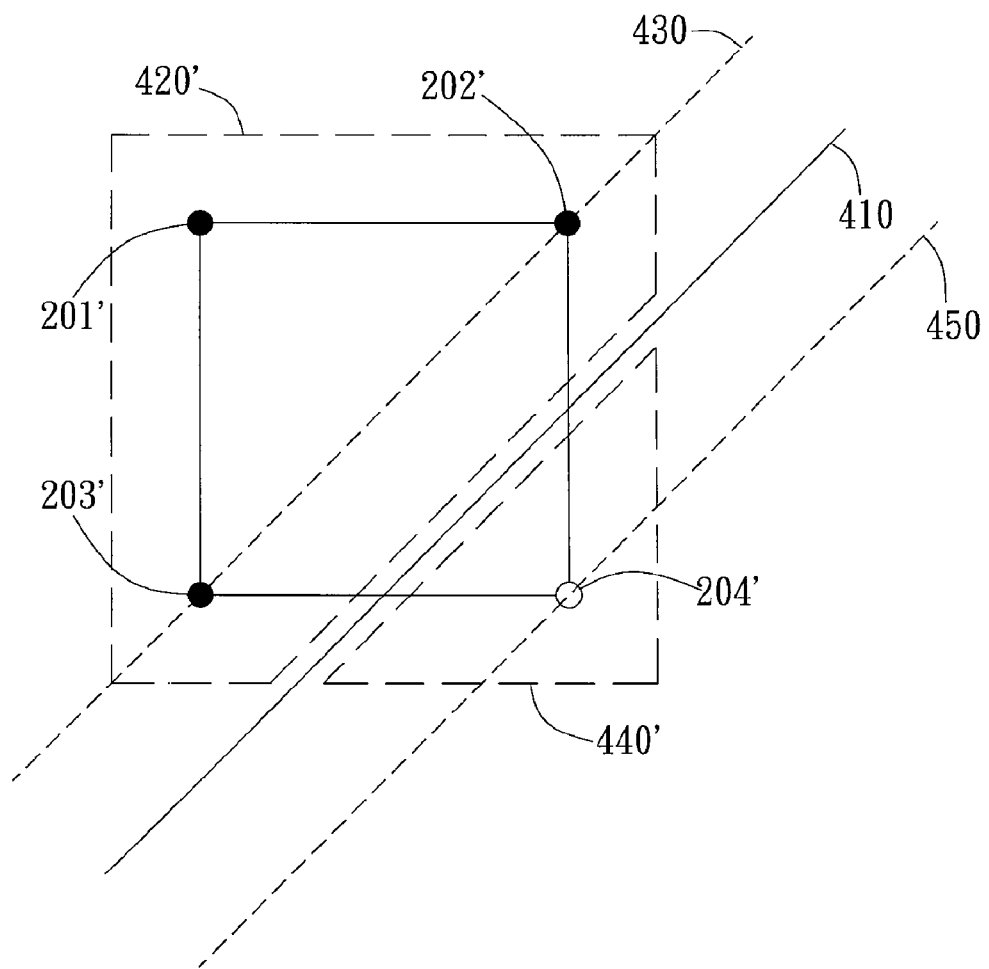
FIG. 4a is a schematic view of a type E predefined unit pixel matrix, a first reference line, a second reference line, and a continuous virtual boundary.

Referring to FIG. 1, when the unit pixel matrix 200 is classified into type E in step 105, the image process method of image enlargement and enhancement will proceed to the step 107. In the step 107, the image signal processing module generates a continuous function representing a continuous virtual boundary 410 between the first pixel group 420 and the second pixel group 440, as shown in FIG. 4*a*. In this step, the image signal processing module has at least two image process methods to obtain the continuous function representing the continuous virtual boundary 410. Now suppose that the unit pixel matrix 200 in classified into type E in step 105. The first image process method to obtain the continuous function is loading in the continuous function corresponding to a predefined edge pattern for type E directly from the hardware memory of the image processing device (the RAM or the ROM). The continuous functions of the predefined edge patterns stored in the hardware memory can be calculated by the image signal processing module prior to executing the image process method for enlarging and enhancing images of the present invention. On the other hand, these continuous functions of the predefined edge patterns can also be uploaded into the hardware memory directly by the user (using other different device to calculate out the functions and then stored them into the hardware memory). The second image process method to obtain the continuous function representing the continuous virtual boundary 410 is calculating out the continuous function directly based on the unit pixel matrix 200. Therefore, in the case, the hardware memory of the image processing device may not have to store the continuous functions for the predefined edge patterns. The following paragraphs explain how the image signal processing module generates the continuous function of the predefined edge patterns for a type E unit pixel matrix 200 using the first image process method.

When using the first image process method to generate the continuous function for a type E unit pixel matrix 200, the image signal processing module first generates a predefined unit pixel matrix 200' that includes a pixel 201', a pixel 202', pixel 203', and pixel 204', as shown in FIG. 4a. This predefined unit pixel matrix 200' is a type E matrix and is identical to the unit pixel matrix 200. That is, pixel 201' is equivalent to pixel 201, pixel 202' is equivalent to pixel 202, pixel 203' is equivalent to pixel 203, and pixel 204' is equivalent to pixel 204. Hence, the first pixel group 420 of the unit pixel matrix 200 corresponds to the first pixel group 420' shown in FIG. 4a, and the second pixel group 440 of the unit pixel matrix 200 corresponds to the second pixel group 440' shown in FIG. 4a.

After the predefined unit pixel matrix 200' is generated, the image signal processing module generates a first reference line 430 and a second reference line 450. Furthermore, as shown in FIG. 4a, the first reference line 430 intersects the first pixel group 420' at two pixels (the pixel 202' and the pixel 203') closest to the pixels of the second pixel group 440', and the second reference line 450 is parallel to the first reference line 430 and intersects the second pixel group 440' at the pixel closest to the first reference line 430 (which is the pixel 204'). Then, the continuous function corresponding to the predefined edge pattern for type E, which generates the continuous virtual boundary 410 shown in FIG. 4a, is obtained by calculating the middle line of the first reference line 430 and the second reference line 450. As shown in FIG. 4a, the continuous virtual boundary 410 separates the first pixel group 420' and the second pixel group 440', wherein the pixels of the first pixel group 420' are represented by solid dots and the pixel of the second pixel group 440' is represented by a hollow dot. However, the way to calculate the continuous function for the predefined edge pattern is not limited to the way mentioned above. Furthermore, the image signal processing module can also generates a discontinuous function to represent the predefined edge pattern. In other words, in the different embodiment, the functions representing the predefined edge patterns stored in the hardware memory of the image processing device can be either continuous or discontinuous, depending on the user's preference.

Figure 4B:
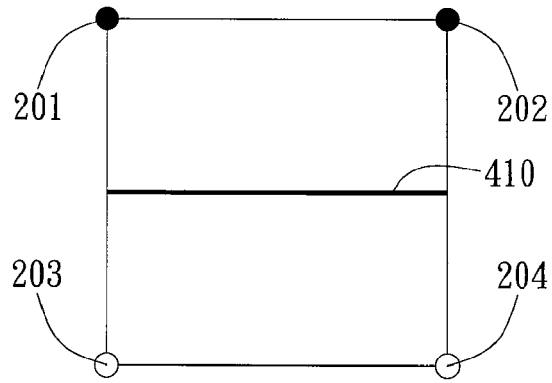
FIG. 4b shows different schematic views of the predefined edge patterns for type A, type B, and type C.
Figure 4B:
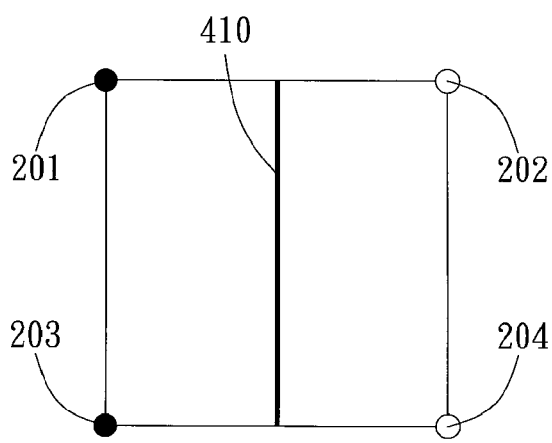
Figure 4B:
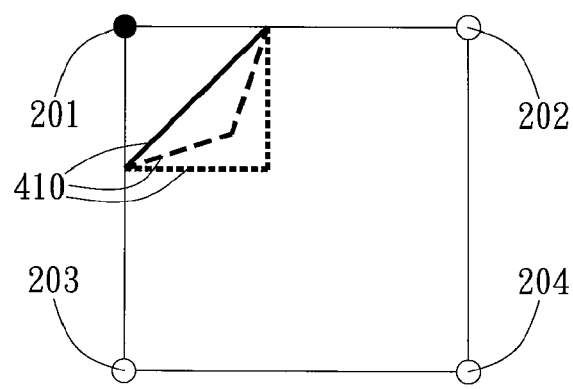

In the first embodiment of the present invention, the image signal processing module can generates twelve different predefined edge patterns, wherein each predefined edge pattern corresponds to a type of unit pixel matrix 200 (type A, B, C, D, E, or F) and the continuous functions representing these twelve predefined edge patterns are stored in the hardware memory of the image processing device, for the image signal processing module to load in later on when necessary. As shown in FIG. 4b, (a) is an exemplary figure of a type A unit pixel matrix 200, wherein its predefined edge pattern that will be loaded in to become the continuous virtual boundary 410 is shown by the solid black line in the figure. (b) is an exemplary figure of a type B unit pixel matrix 200, wherein its predefined edge pattern that will be loaded in to become the continuous virtual boundary 410 is also shown by the solid black line in the figure. Finally, (c) is an exemplary figure of a type C unit pixel matrix 200, and this type of unit pixel matrix 200 can have three different predefined edge patterns, which are shown in the figure in solid black line, dash line, and dotted line, respectively. Similarly, the type D unit pixel matrix 200, the type E unit pixel matrix 200, and the type F unit pixel matrix 200 each can also have three different predefined edge patterns, but they are not discussed in here.

Figure 4C:
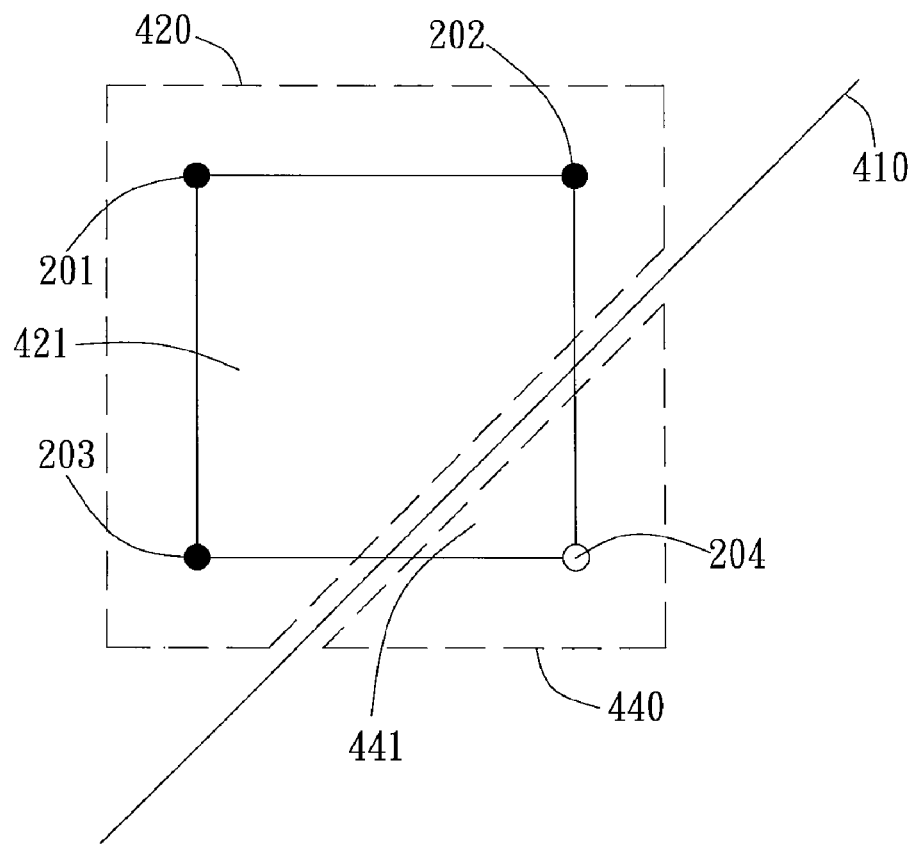
FIG. 4c is a schematic view of a type E unit pixel matrix, a continuous virtual boundary, a first region, and a second region.

Referring to FIG. 1, when the continuous function representing the continuous virtual boundary 410 between the first pixel group 420 and the second pixel group 440 of the unit pixel matrix 200 is generated in step 107, the image process method of image enlargement and enhancement will proceed to the step 109. In the step 109, the image signal processing module inserts pixels inside a first region 421 and a second region 441 of the unit pixel matrix 200. As a result, when the image block is outputted into a display device (such as a liquid crystal display, LCD), the areas corresponding to the first region 421 and the second region 441 in the image block will be enlarged as the image block is displayed by the display device. As shown in FIG. 4c, the first region 421 is encompassed by the continuous virtual boundary 410 and the pixels of the first pixel group 420, and the second region 441 is encompassed by the continuous virtual boundary 410 and the pixel of the second pixel group 440 (in FIG. 4c, the pixels of the first pixel group 420 are represented by solid dots and the pixel of the second pixel group 440 is represented by a hollow dot). Furthermore, the image signal processing module performs extrapolation to obtain the image parameters of the pixel inserted inside the first region 421 and the second region 441 of the unit pixel matrix 200. In this embodiment, the extrapolation used can be linear extrapolation, non-linear extrapolation, nearest neighbor extrapolation, or its equivalents.

When new pixels are inserted inside the first region 421 and the second region 441 for enlarging the unit pixel matrix 200 in step 109, the image process method of image enlargement and enhancement will proceed to the step 111. In the step 111, the image signal processing module checks if all of the pixels in the image block have been processed. If so, the image processing device terminates the implementation of the image process method of image enlargement and enhancement; if not, the image signal processing module execute step 113. In step 113, the image signal processing module acquires a new unit pixel matrix 200 that has not been processed from the image block.

Figure 5:
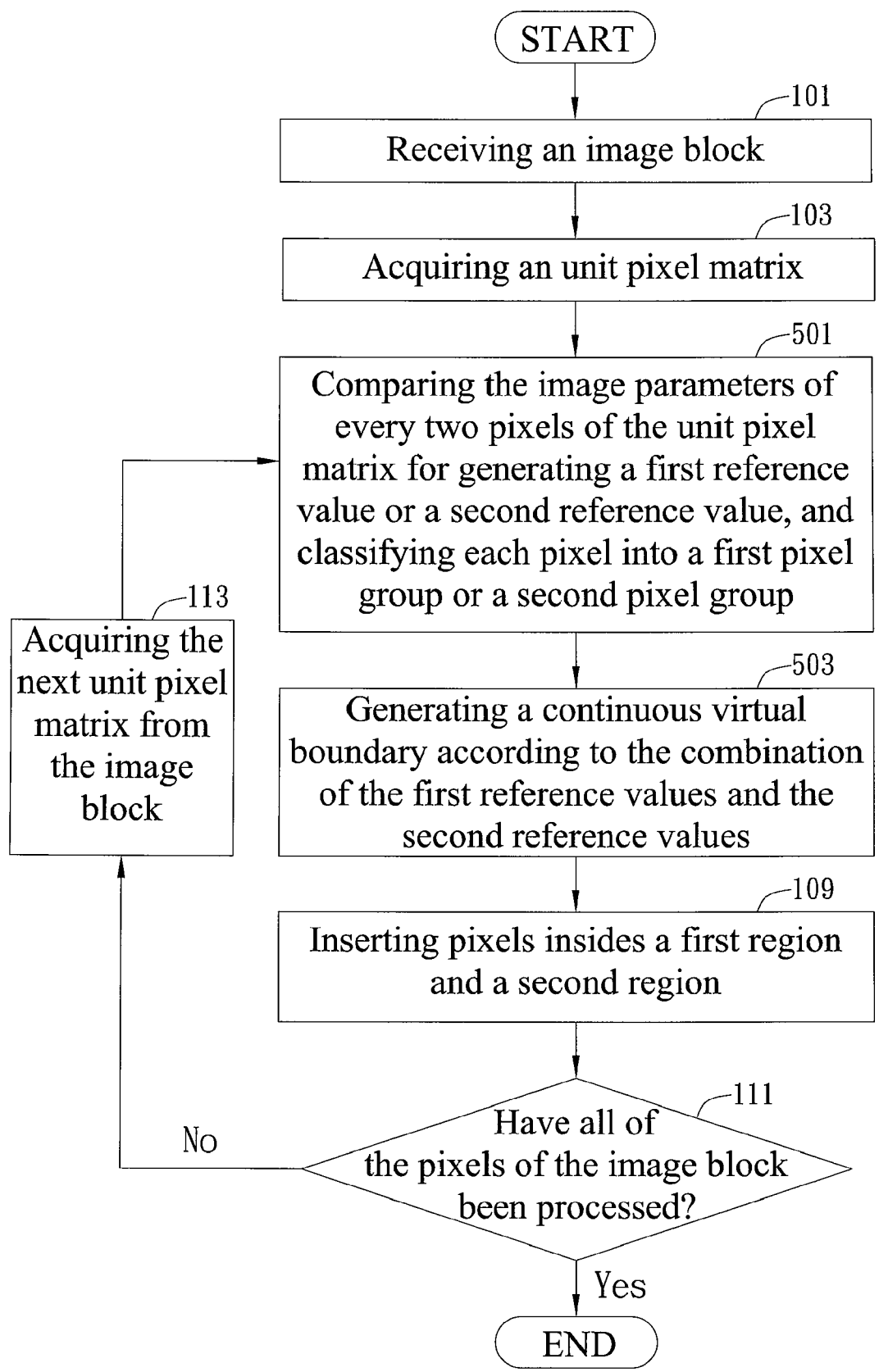
FIG. 5 is a flowchart of the second embodiment of the present invention.

The second embodiment of the present invention is shown in FIG. 5. The second embodiment of the present invention is a image process method of image enlargement and enhancement used in an image processing device. The second embodiment is generally the same as the first embodiment. The only differences between the two embodiments are the way that the image signal processing module compares the image parameters of the pixels and the way that the image signal processing module generates the continuous virtual boundary 410, which are carried out in step 501 and step 503 shown in FIG. 5.

In step 501, the image signal processing module first compares the image parameters of every two pixels of the unit pixel matrix 200. In other words, the image signal processing module compares the image parameter of the pixel 201 with the image parameter of the pixel 202, the image parameter of the pixel 201 with the image parameter of the pixel 203, the image parameter of the pixel 201 with the image parameter of the pixel 204, the image parameter of the pixel 202 with the image parameter of the pixel 203, the image parameter of the pixel 202 with the image parameter of the pixel 204, and the image parameter of the pixel 203 with the image parameter of the pixel 204. The way that the image signal processing module compares the image parameters of the pixels in step 501 is (take the pixel 201 and the pixel 202 as an example) first to computes the discrepancy in the image parameters of the pixel 201 and the pixel 202. Then, if the image signal processing module determines that the image parameter discrepancy value computed is less than a threshold value, the image signal processing module classifies the pixel 201 and the pixel 202 into the first pixel group 420 and at the same time generates a first reference value. If the image signal processing module determines that the image parameter discrepancy value is greater than the threshold value, the image signal processing module classifies the pixel 201 and the pixel 202 into the first pixel group 420 and the second pixel group 440 respectively and at the same time generates a second reference value. The image signal processing module uses the same way to compare the image parameters of each pair of pixels in the unit pixel matrix 200, classifies each pixel according to each comparison result, and generates a first reference value or a second reference value according to each comparison result. Therefore, a data set consisted of six quantities is generated, wherein the six quantities is a combination of the first reference values and the second reference values. In this embodiment, the first reference value is 1, and the second reference value is 0. However, depending on the user's preference, the first reference value and the second reference value can each be set to a different value.

When the data set of six quantities consisted of the combination of the first reference values and the second reference values is generated in step 501, the image process method of image enlargement and enhancement of the second embodiment will proceed to step 503. In step 503, the image signal processing module generates a continuous virtual boundary according to the data set obtained from step 501. The way to generate the continuous virtual boundary is analogous to the first image process method that the image signal processing module uses to generate the continuous virtual boundary in step 107 of the first embodiment. That is, the image signal processing module loads in (from the hardware memory of the image processing device) a continuous function for a predefined edge pattern corresponding to the data set obtained in the step 501 in order to generate the continuous virtual boundary. The hardware memory of the image processing device stores a plurality of continuous functions for the predefined edge patterns, and each predefined edge pattern corresponds to a different data set. Furthermore, the continuous functions of these predefined edge patterns can be calculated using the first image process method described in the step 107 of the first embodiment.

Figure 6:
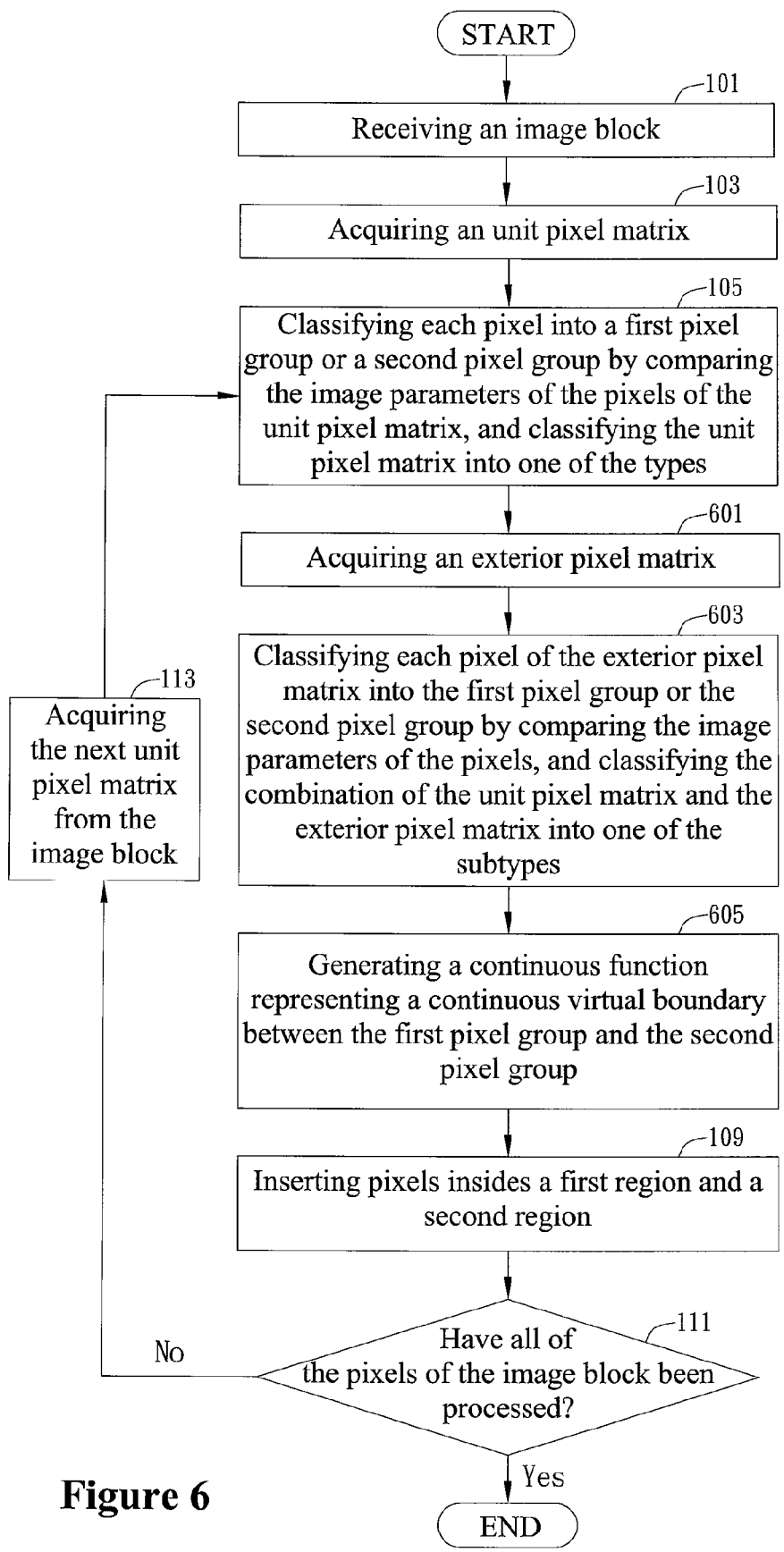
FIG. 6 is a flowchart of the third embodiment of the present invention.

FIG. 6 shows the flow chart of the third embodiment of the present invention. The third embodiment of the present invention is an image process method of image enlargement and enhancement used in an image processing device, and is generally the same as the first embodiment. The only difference between the two embodiments is the way that the image signal processing module generates the continuous virtual boundary 410, which is carried out in the step 105, the step 601, the step 603, and the step 605 shown in FIG. 6.

Figure 7A:
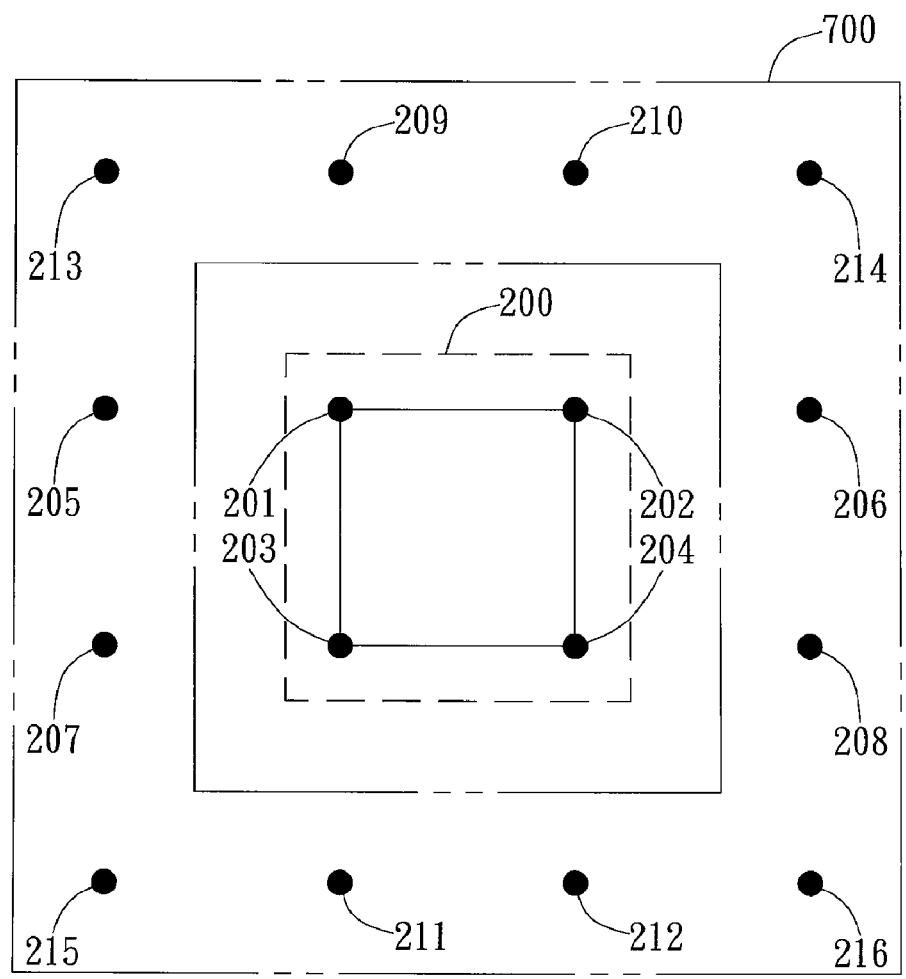
FIG. 7a is a schematic view of a unit pixel matrix and an exterior pixel matrix.

Now assume that the unit pixel matrix 200 is classified into type E in step 105, then the image process method of image enlargement and enhancement of the present invention will proceed to the step 601. In the step 601, the image signal processing module acquires an exterior pixel matrix 700 from the image block received in the step 101. The exterior pixel matrix 700 includes a total of twelve reference pixels, which are the reference pixel 205, 206, 207, 208, 209, 210, 211, 212, 213, 214, 215, and 216 shown in FIG. 7a. Furthermore, the exterior pixel matrix 700 encloses the unit pixel matrix 200, and each reference pixel of the exterior pixel matrix 700 is associated with an image parameter.

Figure 7B:
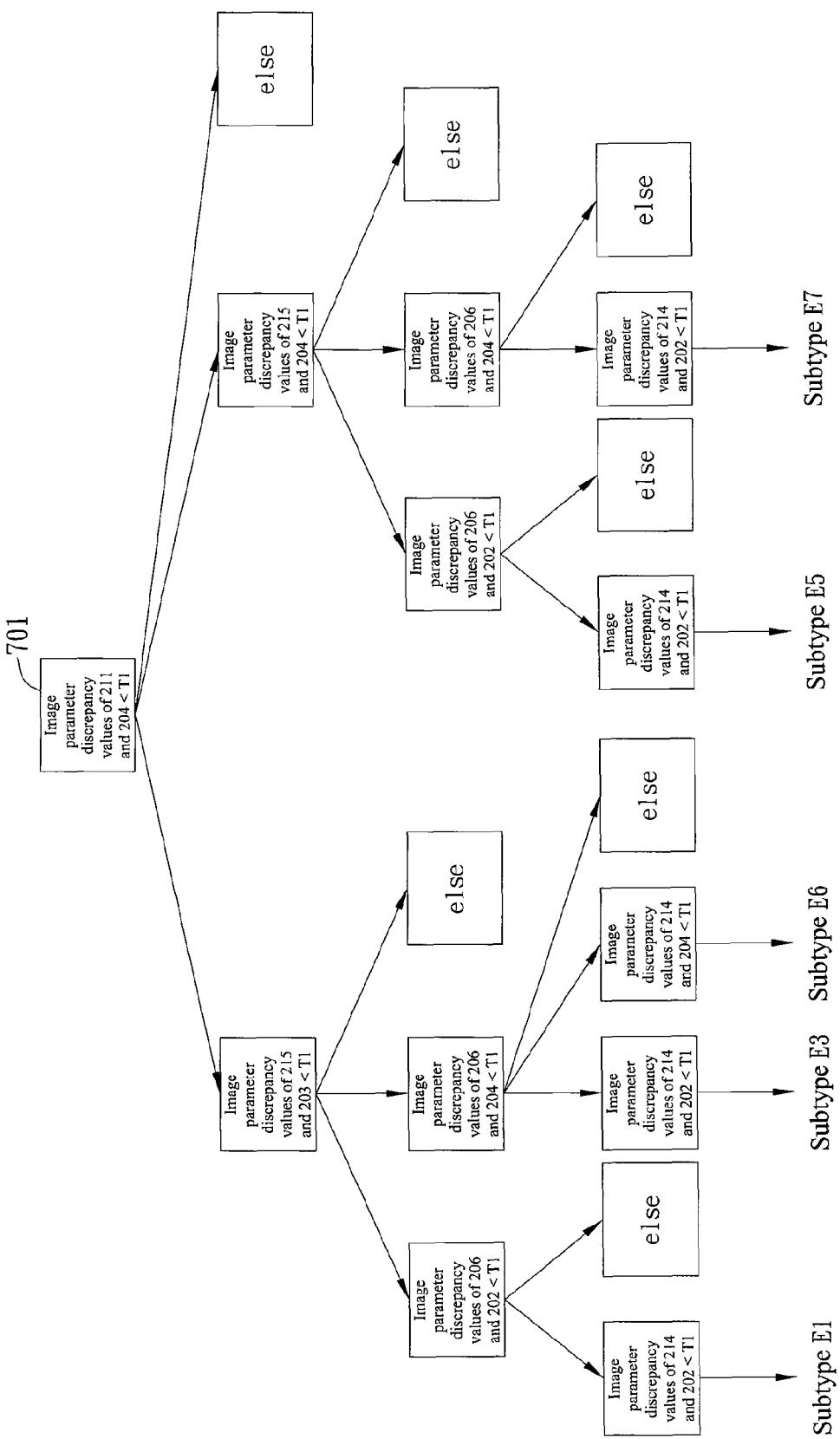
FIG. 7b and FIG. 7c are the tree structures showing how the pixels and the reference pixels are compared and classified in the third embodiment of the present invention.
Figure 7C:
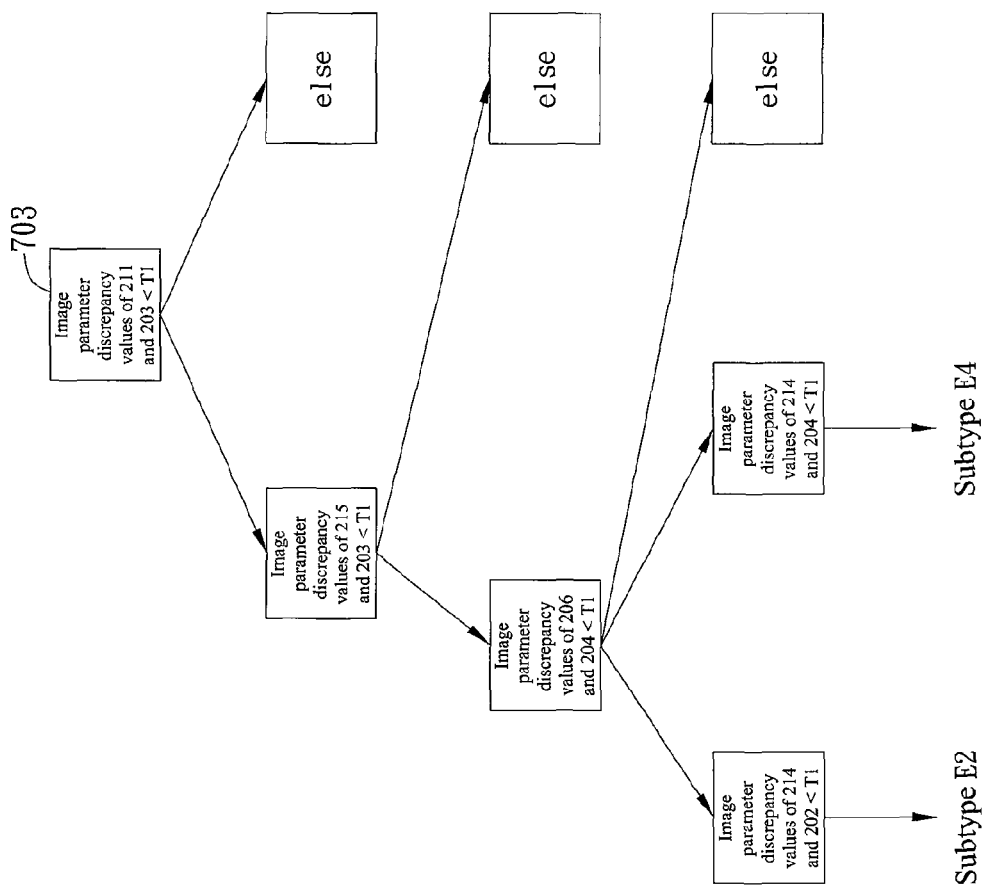

When the exterior pixel matrix 700 is acquired in the step 601, the image process method of image enlargement and enhancement will proceed to the step 603. In the step 603, the image signal processing module compares the image parameters of the reference pixels in the exterior pixel matrix 700 with the image parameters of the pixels in the unit pixel matrix 200 (FIGS. 7b and 7c shows the way that the image parameters of the reference pixels are compared with the image parameters of the pixels of the type E unit pixel matrix 200 being classified in the step 105). Then, the image signal processing module classifies each reference pixel into the first pixel group 420 or the second pixel group 440 according to the comparison result, similar to the way that the image signal processing module classifies the pixel of the unit pixel matrix 200 in the step 105. As shown in the tree structure of FIGS. 7b and 7c, if the unit pixel matrix 200 is classified into type E in the step 105, the combination of the exterior pixel matrix 700 and this type E unit pixel matrix 200 is able to be classified into seven possible subtypes, which are subtype E1, subtype E2, subtype E3, subtype E4, subtype E5, subtype E6, and subtype E7. In the step 603, when the unit pixel matrix 200 is type E, the image process method of image enlargement and enhancement will perform to the comparison step 701. In the comparison step 701, the discrepancy in the image parameters of the reference pixel 211 and the pixel 204 is computed and compared. If the image signal processing module determines that this image parameter discrepancy value computed is less than the first threshold value T1, this combination of the exterior pixel matrix 700 and the type E unit pixel matrix 200 is able to be classified into subtype E1, subtype E3, subtype E5, subtype E6, or subtype E7, as shown in the tree structure of FIG. 7b. However, if the discrepancy in the image parameters of the reference pixel 211 and the pixel 204 is not less than the first threshold value T1, the comparison step 703 is performed. In the comparison step 703, the discrepancy in the image parameters of the reference pixel 211 and the pixel 203 is computed and compared. If the image signal processing module determines that this image parameter discrepancy value computed is less than the first threshold value T1, this combination of the exterior pixel matrix 700 and the type E unit pixel matrix 200 is able to be classified into subtype E2 or subtype E4, as shown in the tree structure of FIG. 7c.

When the combination of the exterior pixel matrix 700 and the unit pixel matrix 200 is classified into one of the subtypes in the step 603, the image process method of image enlargement and enhancement will proceed to the step 605. Now suppose that the combination of the exterior pixel matrix 700 and the unit pixel matrix 200 is classified into subtype E5 in the step 603 and each of the pixels and each of the reference pixels are classified into the first pixel group 420 or the second pixel group 440. In the step 605, the image signal processing module generates a continuous function representing a continuous virtual boundary 410 between the first pixel group 420 and the second pixel group 440. The image signal processing module can load in the continuous function corresponding to the predefined edge pattern for subtype E5 directly from the hardware memory of the image processing device to represent the continuous virtual boundary 410. The image signal processing module can also calculate out the continuous function itself directly. The way that the continuous functions of the predefined edge patterns stored in the hardware memory are generated is the similar to the way that is described in step 107 of the first embodiment.

Figure 7D:
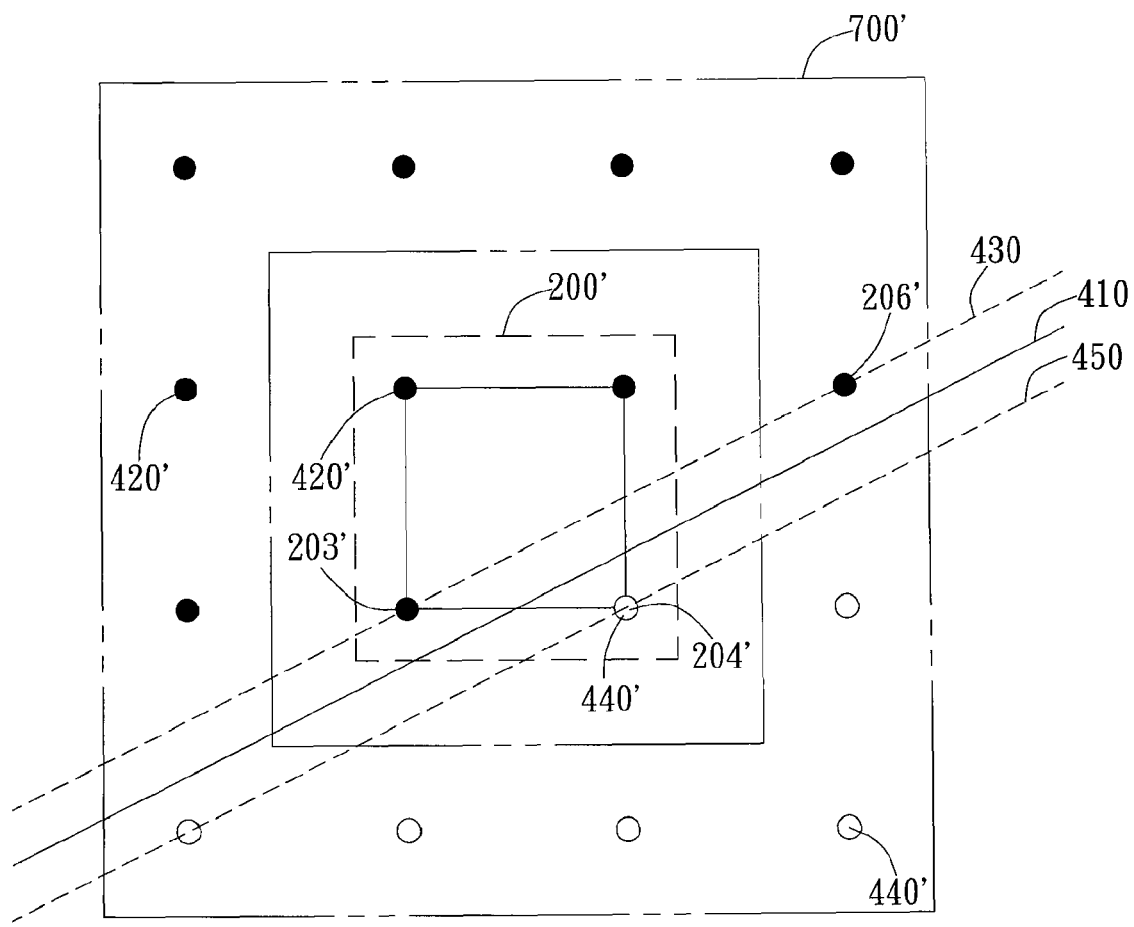
FIG. 7d is a schematic view of a subtype E5 predefined unit pixel matrix and predefined exterior pixel matrix, a first reference line, a second reference line, and a continuous virtual boundary.
Figure 7E:
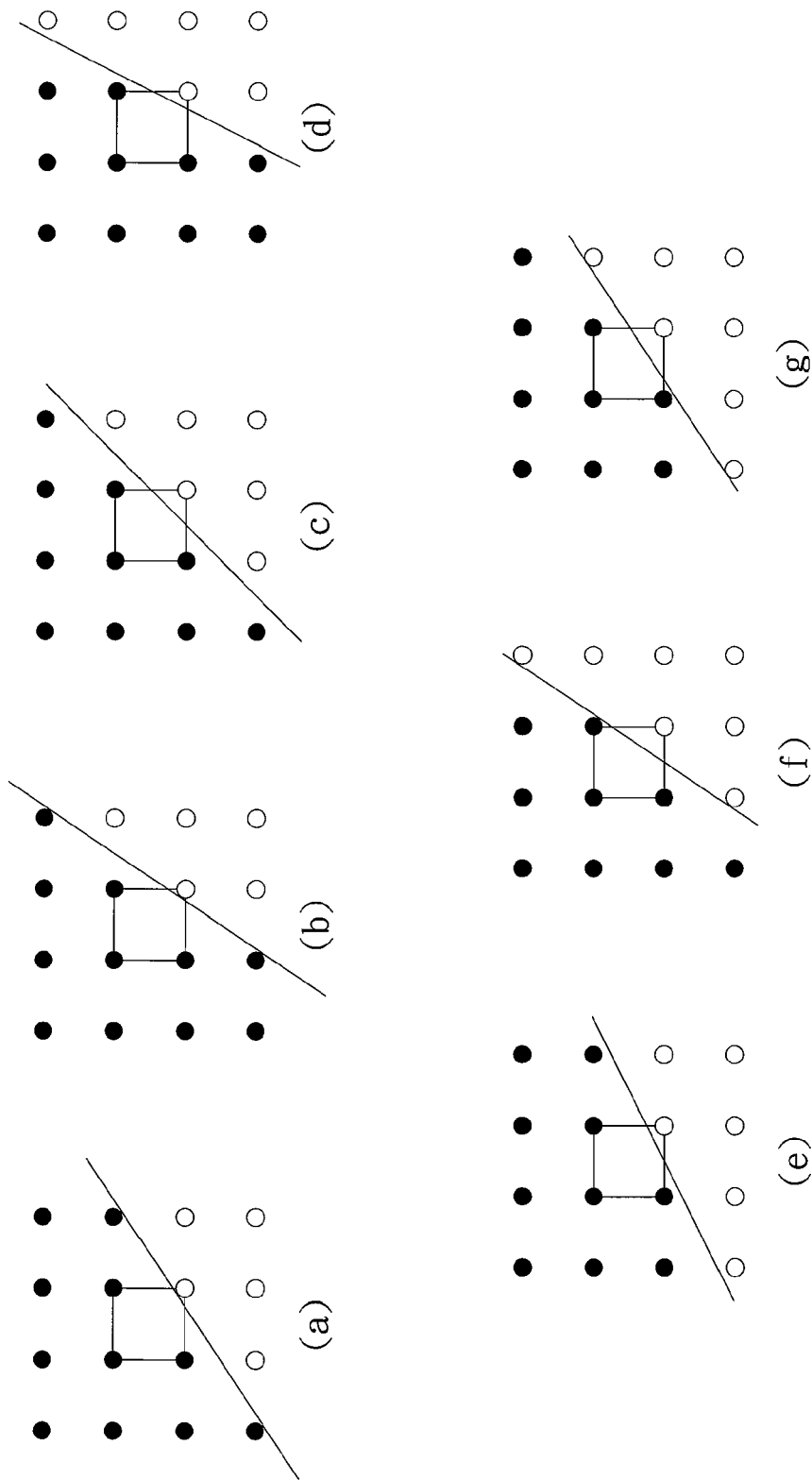
FIG. 7e is schematic views of the predefined edge patterns for subtype E1, subtype E2, subtype E3, subtype E4, subtype E5, subtype E6, and subtype E7.

How the image signal processing module generates the continuous function of the predefined edge pattern for subtype E5 is explained in FIG. 7d. As shown in FIG. 7d, the image signal processing module first generate a predefined unit pixel matrix 200' and a predefined exterior pixel matrix 700'. The predefined unit pixel matrix 200' is identical to the unit pixel matrix 200 of the present embodiment, and the predefined exterior pixel matrix 700' is identical to the exterior pixel matrix 700 of the present embodiment, wherein the pixel 203 is equivalent to the pixel 203', the pixel 204 is equivalent to the pixel 204', the reference pixel 206 is equivalent to the reference pixel 206', the first pixel group 420 corresponds to the first pixel group 420', and the second pixel group 440 corresponds to the second pixel group 440' (the pixels and the reference pixels of the first pixel group 420' are each represented by a solid dot and the pixels and the reference pixels of the second pixel group 440' are each represented by a hollow dot). After the predefined unit pixel matrix 200' and the predefined exterior pixel matrix 700' are generated, the image signal processing module then generates a first reference line 430 and a second reference line 450. As shown in FIG. 7d, the first reference line 430 intersects the first pixel group 420' at two pixels (the pixel 203' and the reference pixel 206') closest to the pixels of the second pixel group 440', and the second reference line 450 is parallel to the first reference line 430 and intersects the second pixel group 440' at the pixel closest to the first reference line 430 (which is the pixel 204'). Then, the continuous function corresponding to the predefined edge pattern for subtype E5, which generates the continuous virtual boundary 410 shown in FIG. 7d, is obtained by calculating the middle line of the first reference line 430 and the second reference line 450. As shown in FIG. 7d, the continuous virtual boundary 410 separates the first pixel group 420' and the second pixel group 440', FIG. 7e shows the predefined edge patterns for the seven subtypes of type E pixel matrix. (a) is an exemplary figure of a subtype E1 combination of the unit pixel matrix 200 and the exterior pixel matrix 700, wherein its predefined edge pattern, which will be loaded in to become the continuous virtual boundary 410, is shown by the solid line in the figure. Similarly, (b) is an exemplary figure for subtype E2 and the corresponding predefined edge pattern is shown by the solid line, (c) is an exemplary figure for subtype E3 and the corresponding predefined edge pattern is shown by the solid line, (d) is an exemplary figure for subtype E4 and the corresponding predefined edge pattern is shown by the solid line, (e) is an exemplary figure for subtype E5 and the corresponding predefined edge pattern is shown by the solid line, (f) is an exemplary figure for subtype E6 and the corresponding predefined edge pattern is shown by the solid line, and (g) is an exemplary figure for subtype E7 and the corresponding predefined edge pattern is shown by the solid line.

In this embodiment, the image signal processing module can generates forty-two different predefined edge patterns, wherein each predefined edge pattern corresponds to a subtype and the continuous functions representing these forty-two predefined edge patterns are stored in the hardware memory of the image processing device, for the image signal processing module to load in later on when necessary. In this embodiment, the image signal processing module is able to classify the unit pixel matrix 200 into six types (type A, B, C, D, E, and F), and each unit pixel matrix 200 combined with the exterior pixel matrix 700 are able to be classified into seven subtypes (in the case of a type E unit pixel matrix 200, the combination of this type E unit pixel matrix 200 and an exterior pixel matrix 700 is able to be classified into subtype E1, E2, E3, E4, E5, E6, and E7). As a result, the image signal processing module is able to classified the combination of the unit pixel matrix 200 and the exterior pixel matrix 700 into forty-two subtypes, and hence forty-two different predefined edge patterns are generated, wherein each predefined edge patterns corresponds to a subtype.

Figure 8:
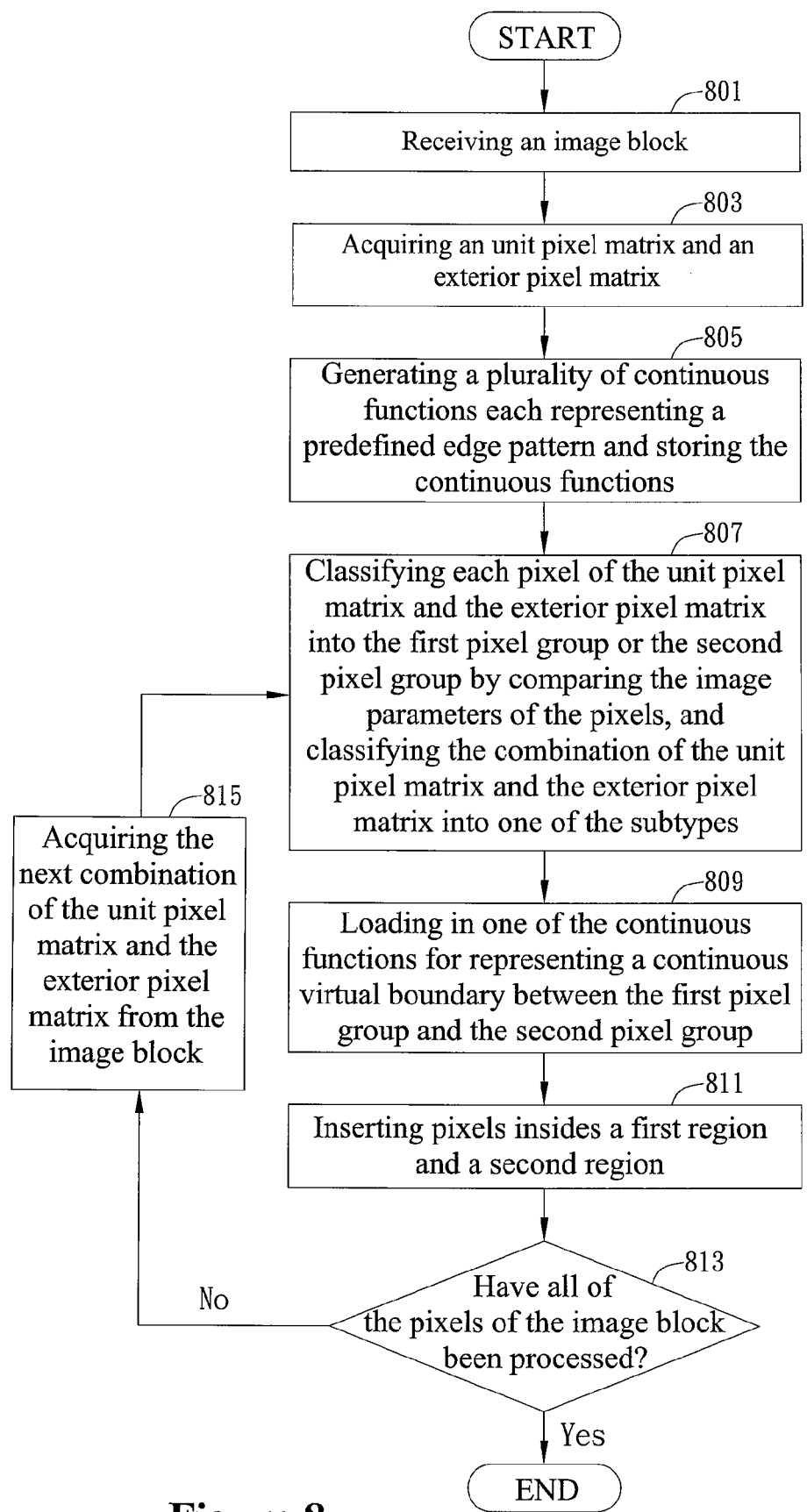
FIG. 8 is a flowchart of the fourth embodiment of the present invention.

The fourth embodiment of the present invention is shown in FIG. 8. The fourth embodiment of the present invention is a image process method of image enlargement and enhancement used in an image processing device. The steps of the image process method exemplified in the fourth embodiment are generally the same as the steps in the third embodiment of the present invention. The only difference between these two embodiments is that the order of the steps is somewhat changed in the fourth embodiment.

FIG. 8 shows the flow chart of the fourth embodiment of the present invention. As shown in FIG. 8, the image process method of image enlargement and enhancement starts out with step 801. In step 801, the image signal processing module receives an image block. Then, the image process method of image enlargement and enhancement will proceed to step 803. In step 803, the image signal processing module acquires a combination of a unit pixel matrix 200 and an exterior pixel matrix 700 from the image signal block. The difference between the third embodiment and the fourth embodiment occurs in this step. In the third embodiment, the image signal processing module first acquires and process the unit pixel matrix 200 (in the step 103 and the step 105 of the third embodiment) then acquires the exterior pixel matrix 700 (in the step 601 of the third embodiment). However, in the step 803 of the fourth embodiment, the image signal processing module acquires the unit pixel matrix 200 and the exterior pixel matrix 700 at the same time.

When the unit pixel matrix 200 and the exterior pixel matrix 700 are acquired from the image signal block in the step 803, the image process method of image enlargement and enhancement will proceed to the step 805. In the step 805, the image signal processing module generates forty-two different continuous functions, wherein each continuous function represents a predefined edge pattern and is stored in the hardware memory of the image processing device. The way that the image signal processing module generates these forty-two continuous functions is the same as the way that is described in the third embodiment of the present invention. Like what it is explained in the step 605 of the third embodiment about how the continuous functions of the predefined edge patterns are generated, in the step 805 of the fourth embodiment, for each one of the forty-two unit pixel matrix 200 and exterior pixel matrix 700 combination, the image signal processing module will generate a predefined unit pixel matrix 200' and a predefined exterior pixel matrix 700' corresponding to the unit pixel matrix 200 and the exterior pixel matrix 700 respectively. Then, for each combination of the predefined unit pixel matrix 200' and the predefined exterior pixel matrix 700', the image signal processing module generates a first reference line 430 and a second reference line 450 according to the pixels and reference pixels of the predefined unit pixel matrix 200' and the predefined exterior pixel matrix 700' respectively. Finally, the continuous function representing the predefined edge pattern is obtained according to the first reference line 430 and the second reference line 450. Each predefined edge pattern intersects the pixels of the predefined unit pixel matrix 200'.

When the forty-two continuous functions are generated and stored in the hardware memory of the image processing device in the step 805, the image process method of image enlargement and enhancement will proceed to the step 807. In the step 807, the image signal processing module compares the image parameter of each pixel of the unit pixel matrix 200 and the image parameter of the each reference pixel of the exterior pixel matrix 700, and then it classifies each pixel and each reference pixel into a first pixel group 420 or a second pixel group 440 according to the comparison results. As a result, each combination of the unit pixel matrix 200 and the exterior pixel matrix 700 will be classified into one of the forty-two subtypes. In this step, the image signal processing module can first classify the unit pixel matrix 200 acquired from the image signal block in the step 803 into one of the six types using the way explained in the step 105 of the third embodiment. Then, the image signal processing module classifies the combination of the unit pixel matrix 200 and the exterior pixel matrix 700 into one of the forty-two subtypes using the way that is explained in the step 603 of the third embodiment.

When the combination of the unit pixel matrix 200 and the exterior pixel matrix 700 is classified into one of the forty-two subtypes in the step 807, the image process method of image enlargement and enhancement will proceed to the step 809. In the step 809, the image signal processing module load in the continuous function corresponding to the predefined edge pattern for the classified subtype directly from the hardware memory of the image processing device to represent the continuous virtual boundary 410.

When the continuous function is loaded in the step 809, the image process method of image enlargement and enhancement will proceed to the step 811. In the step 811, the image signal processing module inserts pixels inside a first region 421 and a second region 441 of the unit pixel matrix 200, wherein this step is the same as the step 109 of the third embodiment.

When new pixels are inserted inside the first region 421 and the second region 441 for enlarging the unit pixel matrix 200 in the step 811, the image process method of image enlargement and enhancement will proceed to the step 813. In the step 813, the image signal processing module checks if all of the pixels in the image block have been processed. If so, the image processing device terminates the implementation of the image process method of image enlargement and enhancement; if not, the image signal processing module executes the step 815.

In the step 815, the image signal processing module acquires a new combination of a unit pixel matrix 200 and an exterior pixel matrix 700 from the image signal block that has not been processed from the image block.

Figure 9:
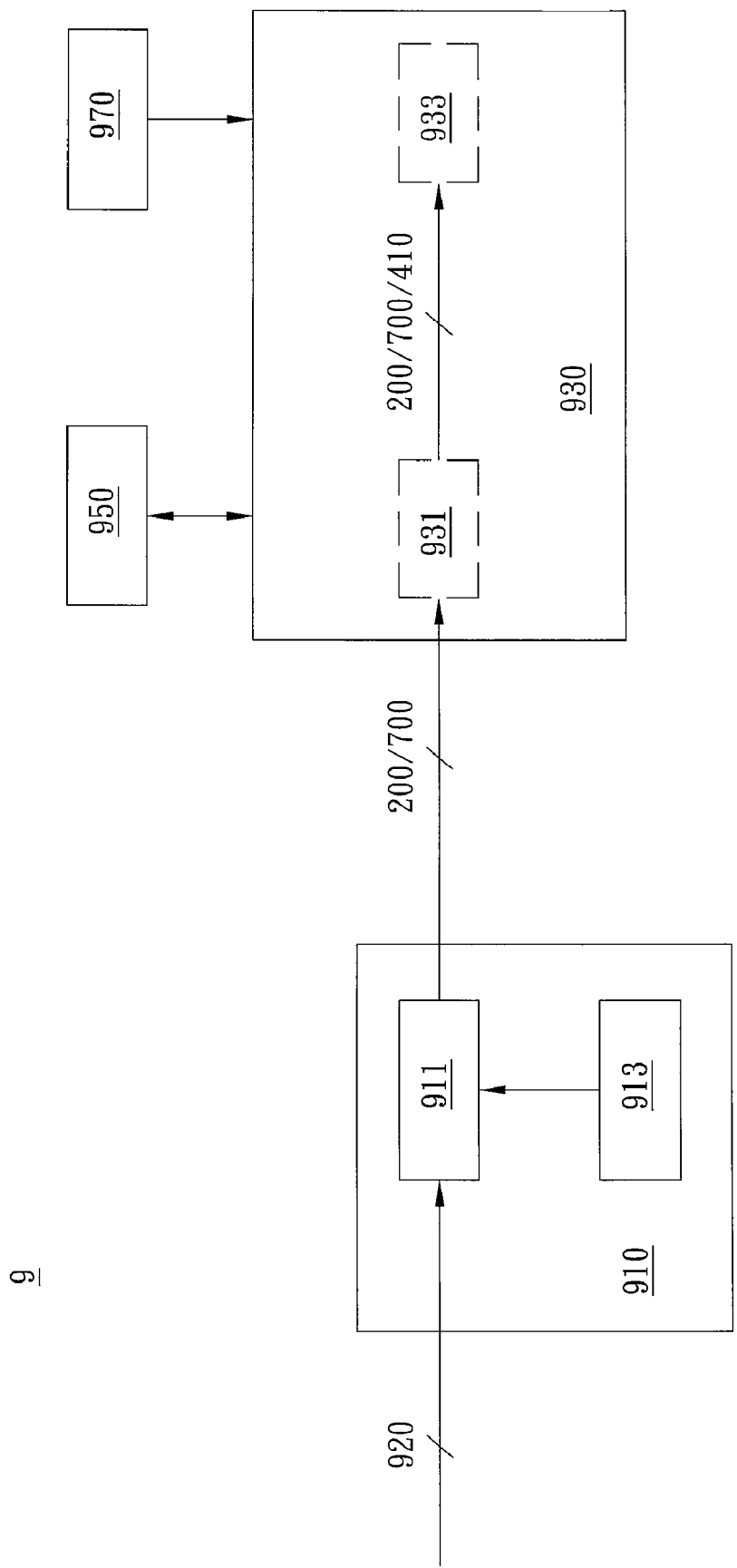
FIG. 9 is a schematic block diagram of the hardware system of the image processing device of the fifth embodiment of the present invention.

The fifth embodiment of the present invention is an image processing device. FIG. 9 is a depiction of the hardware system of an image processing device 9. As shown in FIG. 9, the image processing device 9 includes an image acquisition module 910, an image signal processing module 930, a RAM (Random Access Memory) 950, and a ROM (Read Only Memory) 970, wherein the image acquisition module 910, the RAM 950, and the ROM 970 are electrically coupled to the image signal processing module 930. The image acquisition module 910 first receives an image block 920 from an image source, and then it sends the image block 920 to the image signal processing module 930. The image block 920 can be a television signal sent from the television station, an image file downloaded from the internet, a picture file taken by the digital camera, or its equivalents. A program can be stored inside the ROM 970, wherein the image signal processing module 930 can control the hardware components of the image processing device 9 according to this program, in order to execute the image process method of image enlargement and enhancement of the present invention or any other related jobs. In this embodiment, the image signal processing module 930 can be a digital signal processor or any other different kind of image signal processor. Furthermore, during the process of executing the program, the image signal processing module 930 can utilize the RAM 950 to perform the necessary arithmetic needed for executing the program.

As shown in FIG. 9, the image acquisition module 910 includes a buffer 911 and a timing controller 913. The image signal processing module 930 includes a logic module 931 and an interpolator/extrapolator 933. The logic module 931 mentioned here can be a software program, an ASIC, or other equivalent software program or hardware component, wherein the logic module 931 is used by the image signal processing module 930 to compare the image parameters of the pixels and the reference pixels as well as other related jobs as mentioned in the previous embodiments.

When the image signal processing module 930 controls the image acquisition module 910 to read in the image block 920, the image block 920 is at first stored inside the buffer 911 temporarily. Then, the image signal processing module 930 controls the timing controller 913 to send time pulses to the buffer 911, which enables the buffer 911 to first acquire an unit pixel matrix 200 and an exterior pixel matrix 700 from the image bock 920 and then to transfer the acquired unit pixel matrix 200 and the acquired exterior pixel matrix 700 to the image signal processing module 930.

When the unit pixel matrix 200 and the exterior pixel matrix 700 are transferred to the image signal processing module 930, the image signal processing module 930 controls the logic module 931 to compare the image parameters of each pixel inside the unit pixel matrix 200 and each reference pixel inside the exterior pixel matrix 700, classify each pixel and each reference pixel into a first pixel group 420 or a second pixel group 440 according to its respective comparison result, and then classify the combination of the unit pixel matrix 200 and the exterior pixel matrix 700 into one of the forty-two subtypes (e.g., see the step 807 of the fourth embodiment for the detail of how the logic module 931 compares the image parameters, classifies the pixels and the reference pixels, and classifies the combination of the unit pixel matrix 200 and the exterior pixel matrix 700). During the process of comparing the image parameters of the pixels and the reference pixels, if the image signal processing module needs to perform interpolation to enlarge the section of the image block encompassed by the unit pixel matrix 200 (this is the situation where the logic module 931 determines that the discrepancy in the image parameters of two pixels in the unit pixel matrix 200 is between a first threshold value T1 and a second threshold value T2), the image signal processing module 930 will transfer the unit pixel matrix 200 and the exterior pixel matrix 700 to the interpolator/extrapolator 933, in order to perform the interpolation.

If the combination of the unit pixel matrix 200 and the exterior pixel matrix 700 can be classified by the image signal processing module 930 into one of the forty-two subtypes, the image signal processing module will load in a continuous function corresponding to the predefined edge pattern for the classified subtype from the ROM 970 to represent the continuous virtual boundary 410. In this embodiment, the image signal processing module 930 can generates forty-two different continuous functions, wherein each continuous function represents a predefined edge pattern and is stored in the ROM 970 of the image processing device 9 (please refer to the step 805 of the fourth embodiment for detail about how the continuous functions are generated by the image signal processing module 930).

After the continuous function representing the continuous virtual boundary 410 is loaded in, the image signal processing module 930 will send the unit pixel matrix 200, the exterior pixel matrix 700, and the continuous function to the interpolator/extrapolator 933, wherein the image signal processing module 930 controls the interpolator/extrapolator 933 to insert pixels inside a first region 421 and a second region 441 and determine the image parameters of the inserted pixels for enlarging the image block encompassed by the unit pixel matrix 200 (please refer to the step 811 of the fourth embodiment for detail about inserting pixels inside the first region 421 and the second region 441).

When the image process method of image enlargement and enhancement of the first, second, third, or fourth embodiment or the image process device of the fifth embodiment are used to enlarge images, through the image edge detection combines with the appropriate way of enlargement (enlargement by interpolation or enlargement by extrapolation), the enlarged image is able to maintain its smooth textures across high-contrast boundaries like edges and rapid contrast change zones. Furthermore, the problem of a blocky or blurry result appears on the enlarged image may also be further improved.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

We claim:

1. A method of image enlargement and enhancement, for processing an image block, comprising:
   using an image processing device to perform the steps of:
   acquiring a unit pixel matrix from an image block, the unit pixel matrix including a plurality of pixels, wherein each pixel is associated with an image parameter;
   classifying each pixel into one of the groups selected from a first pixel group and a second pixel group by comparing the image parameters of the pixels of the unit pixel matrix;
   generating a continuous virtual boundary between the first pixel group and the second pixel group; and
   inserting pixels inside a first region and a second region and determining image parameters of the inserted pixels for enlarging the image block, wherein the first region is encompassed by the continuous virtual boundary and the pixels of the first pixel group, and the second region is encompassed by the continuous virtual boundary and the pixels of the second pixel group,
   wherein the classifying step comprises:
   comparing the image parameters of two pixels from the unit pixel matrix to obtain an image parameter discrepancy value;
   classifying the two pixels into the first pixel group if the image parameter discrepancy value is less than a first threshold value; and
   classifying the two pixels into the first pixel group and the second pixel group respectively if the image parameter discrepancy value is greater than a second threshold value, wherein the second threshold value is greater than the first threshold value.

2. The method of image enlargement and enhancement according to claim 1, wherein the unit pixel matrix includes a first pixel, a second pixel, a third pixel and a fourth pixel forming a 2×2 square array of pixels.

3. The method of image enlargement and enhancement according to claim 1, wherein the classifying step comprises:
   comparing the image parameter of the first pixel to the image parameter of the second pixel, the image parameter of the third pixel to the image parameter of the fourth pixel, and the image parameter of the first pixel to the image parameter of the third pixel;
   obtaining an image parameter discrepancy value according to the comparing result for each compared pair of pixels;
   classifying the pixels of the compared pair into the first pixel group if the image parameter discrepancy value is less than a first threshold value; and
   classifying the pixels of the compared pair into the first pixel group and the second pixel group respectively if the image parameter discrepancy value is greater than a second threshold value.

4. The method of image enlargement and enhancement according to claim 1, wherein the unit pixel matrix includes a 4×2 array of eight pixels.

5. The method of image enlargement and enhancement according to claim 1, wherein the image parameter is selected from the group of luminance, color, hue, and saturation.

6. The method of image enlargement and enhancement according to claim 1, wherein the classifying step comprises:
   comparing the image parameter of the pixel to the image parameter of every other pixel in the unit pixel matrix for obtaining an image parameter discrepancy value respectively;
   classifying the two pixels into the first pixel group and generating a first reference value if the image parameter discrepancy value is less than a threshold value; and
   classifying the two pixels into the first pixel group and the second pixel group respectively and generating a second reference value if the image parameter discrepancy value is greater than the threshold value.

7. The method of image enlargement and enhancement according to claim 6, wherein the boundary generating step comprises:
   generating the continuous virtual boundary according to the combination of the first reference values and the second reference values.

8. The method of image enlargement and enhancement according to claim 1, wherein the classifying step comprises:
   performing interpolation to obtain the image parameters of the pixels inserted inside the unit pixel matrix if the image parameter discrepancy value is between the first threshold value and the second threshold value.

9. The method of image enlargement and enhancement according to claim 8, wherein the interpolation method performed includes one of the methods selected from bicubic interpolation, bilinear interpolation, and nearest neighbor interpolation.

10. The method of image enlargement and enhancement according to claim 1, wherein the boundary generating step comprises:
    generating a continuous function corresponding to the continuous virtual boundary.

11. The method of image enlargement and enhancement according to claim 1, wherein the boundary generating step comprises:
    generating a first reference line, wherein the first reference line intersects two pixels of the first pixel group closest to the pixels of the second pixel group;
    generating a second reference line, wherein the second reference line is parallel to the first reference line and intersects the second pixel group; and
    generating the continuous virtual boundary, wherein the continuous virtual boundary is between the first reference line and the second reference line.

12. The method of image enlargement and enhancement according to claim 11, wherein the second reference line intersects a pixel of the second pixel group closest to the first reference line.

13. The method of image enlargement and enhancement according to claim 11, wherein the continuous virtual boundary is a midline of the first reference line and the second reference line.

14. The method of image enlargement and enhancement according to claim 1, wherein the pixel inserting step comprises:
performing extrapolation to obtain the image parameters of the pixels inserted inside the unit pixel matrix.

15. The method of image enlargement and enhancement according to claim 1, wherein the generating step comprises:
acquiring an exterior pixel matrix from the image block, the exterior pixel matrix includes a plurality of auxiliary pixels, wherein the auxiliary pixels enclose the unit pixel matrix, and each auxiliary pixel is associated with an image parameter;
classifying each auxiliary pixel of the exterior pixel matrix into one of the groups selected from the first pixel group and the second pixel group by comparing the image parameters of the auxiliary pixels; and
generating a first reference line, wherein the first reference line intersects two pixels of the first pixel group closest to the second pixel group;
generating a second reference line, wherein the second reference line is parallel to the first reference line and intersects the second pixel group; and
generating a continuous virtual boundary between the first reference line and the second reference line.

16. A method of image enlargement and enhancement, for processing an image block, comprising:
using an image processing device to perform the steps of:
acquiring an unit pixel matrix and an exterior pixel matrix from an image block, wherein the unit pixel matrix and the exterior pixel matrix including a plurality of pixels and a plurality of auxiliary pixels respectively, and each pixel and auxiliary pixel is associated with an image parameter respectively;
generating a plurality of predefined edge patterns, wherein each predefined edge pattern passes between the pixels of the unit pixel matrix;
classifying each pixel into one of the groups selected from a first pixel group and a second pixel group by comparing the image parameters of the pixels and the auxiliary pixels;
setting one of the predefined edge patterns as a continuous virtual boundary between the first pixel group and the second pixel group according to the comparison results; and
inserting pixels inside a first region and a second region and determining image parameters of the inserted pixels for enlarging the image block, wherein the first region is encompassed by the continuous virtual boundary and the pixels of the first pixel group from the unit pixel matrix, and the second region is encompassed by the continuous virtual boundary and the pixels of the second pixel group from the unit pixel matrix,
wherein the classifying step comprises:
comparing the image parameters of a pair of pixels selected from the exterior pixel matrix and the unit pixel matrix to obtain an image parameter discrepancy value from every compared pair of pixels;
classifying the two pixels into the first pixel group if the image parameter discrepancy value is less than a first threshold value; and
classifying the two pixels into the first pixel group and the second pixel group respectively if the image parameter discrepancy value is greater than a second threshold value.

17. The method of image enlargement and enhancement according to claim 16, wherein the unit pixel matrix includes a first pixel, a second pixel, a third pixel and a fourth pixel forming a 2×2 square array of pixels, and the auxiliary pixels of the exterior pixel matrix enclose the unit pixel matrix.

18. The method of image enlargement and enhancement according to claim 16, wherein the image parameter is selected from the group of luminance, color, hue, and saturation.

19. The method of image enlargement and enhancement according to claim 16, wherein the patterns generating step comprises:
generating continuous functions corresponding to the predefined edge patterns respectively.

20. The method of image enlargement and enhancement according to claim 16, wherein the patterns generating step comprises:
generating a first reference line, wherein the first reference line intersects two pixels of the first pixel group closest to the second pixel group;
generating a second reference line, wherein the second reference line is parallel to the first reference line and passes through the unit pixel matrix, and intersects a pixel of the second pixel group closet to the firs reference line; and
generating the predefined edge pattern, wherein the predefined edge pattern is between the first reference line and the second reference line.

21. The method of image enlargement and enhancement according to claim 16, wherein the predefined edge pattern is a midline of the first reference line and the second reference line.

22. The method of image enlargement and enhancement according to claim 16, wherein the classifying step comprises:
performing interpolation to obtain the image parameters of the pixels inserted inside the unit pixel matrix if the image parameter discrepancy value is between the first threshold value and the second threshold value.

23. The method of image enlargement and enhancement according to claim 22, wherein the interpolation method performed includes one of the methods selected from bicubic interpolation, bilinear interpolation, and nearest neighbor interpolation.

24. The method of image enlargement and enhancement according to claim 16, wherein the pixels inserting step comprises:
performing extrapolation to obtain the image parameters of the pixels inserted inside the unit pixel matrix.

25. An image processing device for enlargement and enhancement, comprising:
an image acquisition module acquiring an unit pixel matrix and an exterior pixel matrix, wherein the unit pixel matrix and the exterior pixel matrix each including a plurality of pixels and a plurality of auxiliary pixels respectively, and each pixel is associated with an image parameter;
a memory module storing a plurality of predefined edge patterns, wherein each predefined edge patterns passes between the pixels of the unit pixel matrix;
an image signal processing module executing the following steps:
classifying each pixel into one of the group selected from a first pixel group and a second pixel group by comparing the image parameters of the pixels and the auxiliary pixels;
setting one of the predefined edge patterns from the memory module as a continuous virtual boundary between the first pixel group and the second pixel group according to the comparison results; and inserting pixels inside a first region and a second region and determining image parameters of the inserted pixels for enlarging the image block, wherein the first region is encompassed by the continuous virtual boundary and the pixels of the first pixel group from the unit pixel matrix, and the second region is encompassed by the continuous virtual boundary and the pixels of the second pixel group from the unit pixel matrix, wherein the image signal processing module includes a logic module for comparing the image parameters of a pair of pixels selected from the exterior pixel matrix and the unit pixel matrix to obtain an image parameter discrepancy value from every compared pair of pixels, if the logic module determines that the image parameter discrepancy value is less than a first threshold value, the image signal processing module classifies the two pixels into the first pixel group, and if the logic module determines that the image parameter discrepancy value is greater than a second threshold value, the image signal processing module classifies the two pixels into the first pixel group and the second pixel group respectively, wherein the second threshold value is greater than the first threshold value.

26. The image processing device according to claim 25, wherein the unit pixel matrix includes a first pixel, a second pixel, a third pixel and a fourth pixel forming a 2×2 square array of pixels, and the auxiliary pixels of the exterior pixel matrix enclose the unit pixel matrix.

27. The image processing device of image enlargement and enhancement according to claim 25, wherein the image parameter is selected from the group of luminance, color, hue, and saturation.

28. The image processing device of image enlargement and enhancement according to claim 25, wherein each predefined edge pattern stored in the memory is represented by a continuous function.

29. The image processing device of image enlargement and enhancement according to claim 25, wherein if the logic module determines that the image parameter discrepancy value is between the first threshold value and the second threshold value, the image signal processing module performs interpolation to obtain the image parameters of the pixels inserted inside the unit pixel matrix.

30. The image processing device of image enlargement and enhancement according to claim 29, wherein the interpolation method performed by the image signal processing module includes one of the methods selected from bicubic interpolation, bilinear interpolation, and nearest neighbor interpolation.

31. The image processing device of image enlargement and enhancement according to claim 25, wherein the image signal processing module performs extrapolation to obtain the image parameters of the pixels inserted inside the unit pixel matrix.

* * * * *